UNITED STATES PATENT OFFICE.

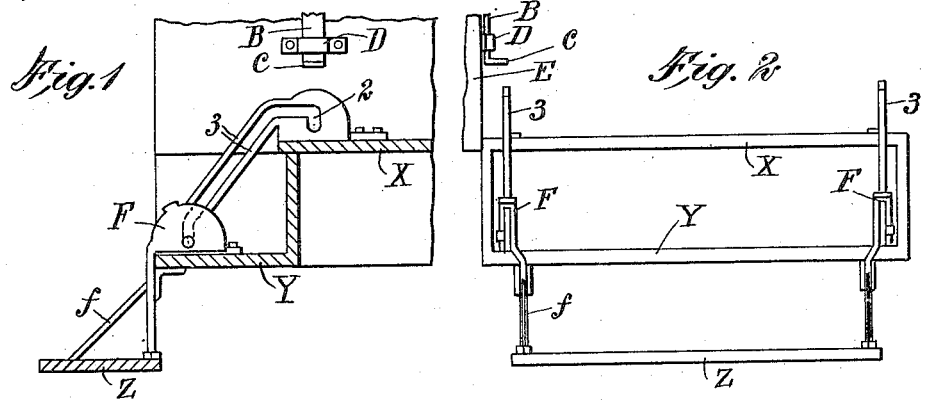
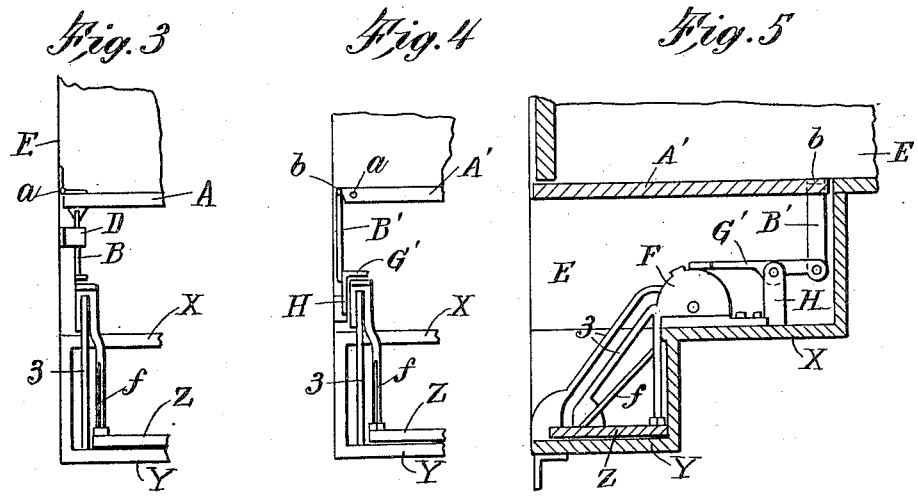
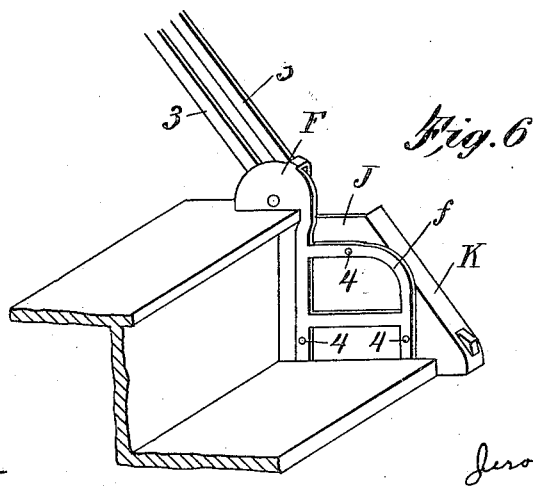

JEROME N. MARQUETTE, OF BINGHAMTON, NEW YORK.

LOCKER AND SNOW-GUARD FOR REMOVABLE CAR-STEPS.

1,075,046.   Specification of Letters Patent.   Patented Oct. 7, 1913.

Application filed June 30, 1913. Serial No. 776,641.

*To all whom it may concern:*

Be it known that I, JEROME N. MARQUETTE, a citizen of the United States, residing at Binghamton, in the county of Broome and State of New York, have invented certain new and useful Improvements in Lockers and Snow-Guards for Removable Car-Steps, of which the following is a specification.

My invention relates to an improvement in lockers and snow guards for removable car steps for railroad cars.

My device works in conjunction with the hinged part of the vestibule platform of a car, and it has for its object to provide an automatic lock for the removable step so as to prevent its being moved or taken out of its closed position when the step is in place and the car closed.

With this object in view, my invention consists in certain novel features of construction and arrangement of parts as will be fully described and pointed out in the claims, reference being had to the accompanying drawings, in which—

Figure 1 is a front view of a fragmentary part of my device in unlocked position and with the removable step let down. Fig. 2 is a side view of a fragmentary part of my device in unlocked position and with removable step let down. Fig. 3 is a side view of my device as applied in locked position to the removable car step. Fig. 4 is a side view of a modified form of my device as applied in locked position to the removable car step. Fig. 5 is a front view of a modified form of my device as applied in locked position to the removable car step, and Fig. 6 is a side view of the snow guard attached to the removable car step.

My device applies particularly to the removable car step device for which I obtained Letters Patent of the United States, March 18, 1913, No. 1,056,745.

The same reference characters denote like parts in each of the several figures of the drawing.

It will be noted that there are two general forms of hinged traps in vestibule car platforms, in one of which the trap, as shown in Fig. 3, is hinged to the car body E at its extreme edge by means of hinge $a$; in the other the hinge or pivot $a$ of the trap A' is at a distance from the extreme edge of the trap.

In carrying out my device I provide, pivotally mounted on the under side of the vestibule floor trap A, the leg B extending vertically downward through and controlled by the guide D mounted on the car body E at the end of the car step X, and having the foot projection C on the base of the same which is directly over the hanger F of the removable step Z when in its socket 2. In another form of my device I have pivotally connected at $b$ with the end of the trap A' the leg B' passing vertically downward beneath the trap A' and having pivotal connection with a horizontal lever G which is pivotally mounted on the support H. This support may be mounted on the step or tread X of the car or against the car body E at the end of the step X, according to the location of the steps and end inclosures of the same. The outer end of the lever G extends directly over the removable step hanger F. In the form shown in Fig. 3, when the step Z is raised up and hanger F is in its socket 2 and trap A is let down, the leg B and foot C glide downward and are positioned close to and directly over said step hanger F.

In the modified form of my device, when the trap A' is let down it raises up the pivotally mounted leg B' which causes the outer end of the lever G' to move downward over the step hanger F. When the foot C or the lever G' are raised up from over the step hanger F the removable step Z and its hanger F can be raised upward and out from its socket 2, and passed downward along the guides 3. 3 to its hanging position on the lower step Y for use of passengers entering or leaving the car. When it is desired to close said step and lock it, the hanging step Z and its hanger F is first raised upward in the guides 3. 3 and let down into its socket 2 on step X. The trap A or A' being then shut down it brings foot C or the end of lever G' directly over the hanger F, and thus the step Z cannot be again lifted out of its socket 2 until the trap A or A' is opened and the vestibule door opened, for the purpose of opening the car. On the outer side of the brace of the removable step Z I have the shield J which has upon it the projected shoulder K. The shield being fastened to the brace $f$ by means of the screws or bolts 4. 4. 4 or any convenient means. When the hanging step Z is moved upward in the guides 3. 3 to be placed in its locked position, the shield J and shoulder K are carried with the step and form one a side shield to guides 3. 3 and the other a top shield, protecting the guides from snow or ice collecting therein.

Thus having described my invention, what I claim as new is as follows:

1. In a lock and snow guard for removable car steps, a rod extending into a foot projection, said rod having hinged connection with the under side of a platform trap of a vestibule car, said foot projection being over and in alinement with the hanger of said step, a guide mounted on the car body or step end, said rod passing through said guide; a vertical shield mounted on said step hanger and having an upper projecting shoulder conforming in alinement with the hangers of said step and adapted to slide above and over the same when said step is moved to its closed position.

2. In a lock and snow guard for removable car steps, a rod having a hinged connection with the inner end of the hinged trap of the car platform, a horizontal lever pivotally mounted on the face of the car body at the end of the car step and having pivotal connection with said rod, the free end of said lever being in alinement with and extending over the hanger of said step; a vertical shield mounted on said step hanger and having an upper projecting shoulder conforming in alinement with the hanger of said step and adapted to slide above and over the same when said step is moved to its closed position.

In testimony whereof I have affixed my signature in presence of two witnesses.

JEROME N. MARQUETTE.

Witnesses:
S. A. VALENTINE,
M. F. TERRY.

Copies of this patent may be obtained for five cents each, by addressing the "Commissioner of Patents, Washington, D. C."